(12) United States Patent
Dykeman et al.

(10) Patent No.: US 9,728,976 B2
(45) Date of Patent: *Aug. 8, 2017

(54) METHOD AND SYSTEM FOR ALLOCATING ENERGY

(71) Applicant: INTERNATIONAL BUSINESS MACHINES CORPORATION, Armonk, NY (US)

(72) Inventors: Harold D. Dykeman, Rueschlikon (CH); Olivier Gallay, Rueschlikon (CH); Olle L. Sundstroem, Rueschlikon (CH); Jacint Szabo, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 624 days.

This patent is subject to a terminal disclaimer.

(21) Appl. No.: 14/060,889

(22) Filed: Oct. 23, 2013

(65) Prior Publication Data

US 2014/0094984 A1 Apr. 3, 2014

Related U.S. Application Data

(63) Continuation of application No. 14/032,759, filed on Sep. 20, 2013.

(30) Foreign Application Priority Data

Sep. 28, 2012 (GB) .................................. 1217363.9

(51) Int. Cl.
*G06F 19/00* (2011.01)
*H02J 4/00* (2006.01)
(Continued)

(52) U.S. Cl.
CPC ............ *H02J 4/00* (2013.01); *G06Q 10/0631* (2013.01); *G06Q 50/06* (2013.01); *H02J 3/008* (2013.01);
(Continued)

(58) Field of Classification Search
CPC ........ H02J 2003/143; H02J 4/00; H02J 3/008; H02J 13/0096; H02J 13/0079; Y02B 20/42; Y02B 70/3241; G06Q 50/06
(Continued)

(56) References Cited

U.S. PATENT DOCUMENTS 7,653,499 B2 * 1/2010 Corrado ................. G06Q 10/06
702/60
8,260,471 B2 * 9/2012 Storch .................... G06Q 10/06
307/132 E
(Continued)

FOREIGN PATENT DOCUMENTS

JP 92010166636 7/2010
JP 92012016105 1/2012
WO WO2012045027 A1 4/2012

OTHER PUBLICATIONS

Schroeder, A., et al. "Modeling Storage and Demand Management in Electricity Distribution Grids" Discussion Papers of DIW Berlin. Mar. 2011. pp. 1-16.

*Primary Examiner* — Michael D Masinick
(74) *Attorney, Agent, or Firm* — Tutunjian & Bitetto, P.C.; David M. Quinn

(57) ABSTRACT

A method for allocating energy to a plurality of devices, wherein each device is configured to consume, store and/or supply energy, the method includes the steps of: assigning each device to a group of devices; assigning an aggregation node device to each group of devices; for a selection of devices transmitting local power cost functions of the devices and/or power usage profiles of the devices with (Continued)

respect to a predetermined time slot to the assigned aggregation node device; at the aggregation node device, generating aggregated data as a function of the received local power cost functions and/or power usage profiles; transmitting the aggregated data to a central processing device; at the central processing device, optimizing a global cost function for allocating power to the devices as a function of the aggregated data.

14 Claims, 5 Drawing Sheets

(51) Int. Cl.
  *G06Q 50/06*   (2012.01)
  *H02J 3/00*   (2006.01)
  *G06Q 10/06*   (2012.01)
  *H02J 13/00*   (2006.01)

(52) U.S. Cl.
  CPC ....... *H02J 13/0079* (2013.01); *H02J 13/0096* (2013.01); *Y02E 60/721* (2013.01); *Y04S 10/126* (2013.01); *Y04S 50/10* (2013.01)

(58) Field of Classification Search
  USPC .......................................... 700/284
  See application file for complete search history.

(56) References Cited

U.S. PATENT DOCUMENTS

| | | | |
|---|---|---|---|
| 8,386,087 B2* | 2/2013 | Spicer | H02J 3/14 700/22 |
| 8,406,937 B2* | 3/2013 | Verfuerth | H05B 37/0209 700/296 |
| 8,671,067 B2* | 3/2014 | Bester | G06Q 50/06 700/276 |
| 9,026,261 B2* | 5/2015 | Bukhin | G06Q 10/06 700/276 |
| 9,209,652 B2* | 12/2015 | Imes | H02J 3/14 |
| 9,270,118 B2* | 2/2016 | Carlson | H01L 31/02021 |
| 2007/0043478 A1* | 2/2007 | Ehlers | F24F 11/0012 700/276 |
| 2008/0039980 A1 | 2/2008 | Pollack et al. | |
| 2011/0004358 A1 | 1/2011 | Pollack et al. | |
| 2011/0047052 A1 | 2/2011 | Cornish | |
| 2011/0208365 A1 | 8/2011 | Miller | |
| 2011/0231028 A1 | 9/2011 | Ozog | |
| 2011/0276194 A1 | 11/2011 | Emalfarb et al. | |
| 2012/0054139 A1 | 3/2012 | Nikovski et al. | |
| 2012/0068540 A1 | 3/2012 | Luo et al. | |

* cited by examiner

METHOD AND SYSTEM FOR ALLOCATING ENERGY

RELATED APPLICATION DATA

This application is a Continuation application of co-pending U.S. patent application Ser. No. 14/032,759 filed on Sep. 20, 2013, incorporated herein by reference in its entirety.

TECHNICAL FIELD

This disclosure relates to methods and systems for allocating energy to a plurality of devices, as for example, electric energy consuming, storing or providing devices in a smart grid environment.

BACKGROUND

Energy-consuming devices, such as electric appliances, need to be supplied with electric current as a function of their use, energy efficiency or operational cycles. On the one hand, the demand for electrical energy of a single device is not continuous. For example, the energy demand of an electric car depends on the planned use and charge state. On the other hand, distributed electric power plants, in particular power supply units based on renewable energies, cannot continuously provide power. Rather, the energy generation depends on external factors, such as solar irradiation or deployable wind power. Therefore, an efficient management of the fluctuations of the power supply and the fluctuations in the demand in the respective power grid is desirable. This issue becomes more and more imminent when renewable energy resources are integrated into the power systems.

Generally, a cost function can be defined that takes into account the availability of distributed energy resources and the consumption profiles of, e.g., electric devices to be supplied with energy. In order to obtain the most efficient use of energy consumers, energy generators and storage capabilities, such global cost functions need to be optimized resulting in suitable profiles for the operation of the devices included in such complex energy distribution systems. The computational efforts for optimizing cost functions scale with the number of devices included in the smart grid network. The computational and communicational resources required for minimizing the cost functions increase in complexity when additional properties for the devices involved are taken into account. For example, modern devices may act as electric energy source, energy storage and/or energy sink, i.e. an electric consumer.

SUMMARY

It is an aspect of the present disclosure to provide an improved method for allocating energy and an improved energy allocation system.

According to an embodiment of a first aspect of the invention a method for allocating energy to a plurality of devices is disclosed. Each device may be configured to consume, store and/or supply energy. The method comprises the steps of:
- assigning each device to a group of devices;
- assigning an aggregation node device to each group of devices;
- for a selection of devices, transmitting local power cost functions of the devices and/or the power usage profiles of the devices with respect to a predetermined time slot to the assigned aggregation node device;
- at the aggregation node device, generating aggregated data as a function of received local power cost functions and/or the power usage profiles;
- transmitting the aggregated data to a central processing device; and
- at the central processing device, optimizing a global cost function for allocating power to the devices as a function of the aggregated data.

An embodiment of another aspect of the invention provides a system for allocating energy comprising:
- a plurality of devices wherein each device is configured to consume, store and/or supply energy, and each device is assigned to a group of devices;
- one aggregation node device assigned to each group of devices; and
- a central processing device for optimizing a global cost function for allocating power to the devices;
- wherein the devices are at least temporarily communicatively coupled to the assigned aggregation node device, and the aggregation node device is at least temporarily communicatively coupled to the central processing device. Further, the aggregation node device is configured to aggregate data received from the devices and to transmit the aggregated data to the central processing device.

In embodiments of the system, the system is implemented to execute the method specified above.

The mentioned devices, for example, can be electric devices. Specifically, the devices may be of the group of: electric cars, heating devices, pumping devices, air conditioning devices, batteries, flyer wheels and household appliances. One may contemplate of further electric devices that may act as energy consumers, energy storage devices or energy generation devices.

According to embodiments of the method and system for allocating energy, the devices are assigned to groups. For example, a group can be characterized by the locality of the devices. One group of devices can be placed in one building, for example. Each group is assigned an aggregation node device. For example, the aggregation node device can communicate with the assigned devices through messages over the communications network. The local power cost functions or the power usage profiles are device-specific data which are transmitted to the aggregation node device. This means that inner state information relating to the devices is aggregated in the aggregation node device and not immediately available to the central processing device. Rather, aggregated data relating to the entire group of devices associated with the aggregation node device is made available to the central processing device.

The central processing device may then—based on the aggregated data and optional data from the energy retailer providing the actual energy prices or costs—calculate an optimized cost function. Thereby, optimization parameters can be obtained which are redistributed to the devices through the aggregation node device(s). Consecutive time slots build a time horizon over which the energy is efficiently allocated to the devices in the system. It may be considered an advantage of the method or system that by employing aggregation node devices, the communicational load in the system is reduced. Further, the calculational effort in, for example, computerized modules in the central processing device, the aggregation node device and/or the electric energy devices is reduced. The method provides for a hierarchical and distributed calculation of the optimized cost function. The lowest hierarchical level or the leaves of the hierarchy are the devices which are administered by users. Every device may receive via the assigned aggregation node device optimization parameters, which are generated by the highest hierarchical level, the central processing device. Based on these data, each device may optimize a local cost function.

In embodiments of the method, the method comprises the step of generating optimization data for each device at the central processing device. The method may further comprise the step of transmitting the optimization data to the devices via the aggregation node devices.

In embodiments of the method, the method comprises optimizing the local power cost functions as a function of the optimization data at devices.

In embodiments of the method, the method comprises the step of, for at least one device of a group, optimizing the local power cost functions as a function of the optimization data for the at least one device at the assigned aggregation node device.

The method may also allow handling the case where electric devices are not provided with calculational capabilities. In this case, the assigned aggregation node device may perform the calculations leading to an optimized local power cost function based on the optimization data received from the central processing device.

In embodiments of the method, the step of optimizing the local power cost function at the devices is independent from the local power cost function of the device and/or the power usage profile of the device with respect to a prior time slot. Instead, the device receives optimization parameters calculated by the root or central processing device and uses the actual power usage profile or local power cost function for performing an optimization step.

In embodiments, the method comprises the step of, for at least one device of a group, providing the assigned aggregation node device with a local power cost function of the at least one device and/or the power usage profile of the at least one device with respect to the predetermined time slot. If devices are unable to perform calculations or cannot be programmed to implement an optimization procedure, such calculation can be done by the assigned aggregation node device to which the device without calculation capabilities group belongs.

In embodiments of the method, certain steps are executed, calculated or performed iteratively. For example, in embodiments of the method, the steps of:

transmitting the local power cost functions of the devices and/or power user profiles of the devices with respect to a predetermined time slot to the assigned aggregation node device;

generating aggregated data as a function of the received local power cost functions and/or power usage profiles;

transmitting the aggregated data to the central processing device;

optimizing the global cost function of allocating power to the devices as a function of the aggregated data;

generating optimization data for each device at the central processing device;

transmitting the optimization data to the devices via the aggregation node device; and optimizing local power cost functions as a function of the optimization data are performed iteratively, e.g., over a plurality of optimization cycles. As a result, the minimum cost power profile can be calculated at the devices in the distributed manner over a predetermined time horizon.

One may contemplate that the assignment of a device to a certain group is changed. Hence, the method may comprise the step of changing an assignment of a device from a first group to a second group. For example, an electric car may move to the location of another aggregation node device and included into the group assigned to the other aggregation node device.

Optimizing may comprise minimizing the global cost function for allocating power to the devices as a function of the aggregated data. One may also contemplate other goals for optimization. For example, it can be desirable to find the minimum price power profile. One may aim at finding a minimized power cost in households. Optimizing the global cost function can also lead to approaching a reference curve for the consumed energy which can be provided by a charging service provider. Further, certain grid constraints can be imposed, such that an efficient energy allocation must obey such constraints set by the charting service provider.

According to an embodiment of another aspect, a computer program product for allocating energy to a plurality of devices is disclosed. Each device is configured to consume, store and/or supply energy, and the computer program product comprises a computer-readable storage medium having computer-readable program code embodied therewith, the computer-readable program code comprising computer-readable program code configured to allocate energy to the devices implementing the steps of:

assigning each device to a group of devices, assigning an aggregation node device to each group of devices;

for the selection of devices, transmitting local power cost functions of the devices and/or power usage profiles of the devices with respect to a predetermined time slot to the assigned aggregation node device;

at the aggregation node device, generating aggregated data as a function of the received local power cost functions and/or power usage profiles;

transmitting the aggregated data to a central processing device;

at the central processing device, optimizing a global cost function for allocating power to the devices as a function of the aggregated data.

The program code may be configured to implement further aspects or steps of the method for allocating energy to devices. The program code can be distributed among the elements forming the system.

The computer program product, for instance, includes computer readable code for implementing aspects of the method for routing in a network depicted above.

Certain embodiments of the presented method for energy allocation and/or the energy allocation system may comprise individual or combined features, method steps or aspects as mentioned above or below with respect to exemplary embodiments.

BRIEF DESCRIPTION OF THE DRAWINGS

In the following, embodiments of methods and devices relating to allocating energy resources are described with reference to the enclosed drawings.

Like or functionally like elements in the drawings have been allotted the same reference characters, if not otherwise indicated.

DETAILED DESCRIPTION OF PREFERRED EMBODIMENTS

Figure 1:
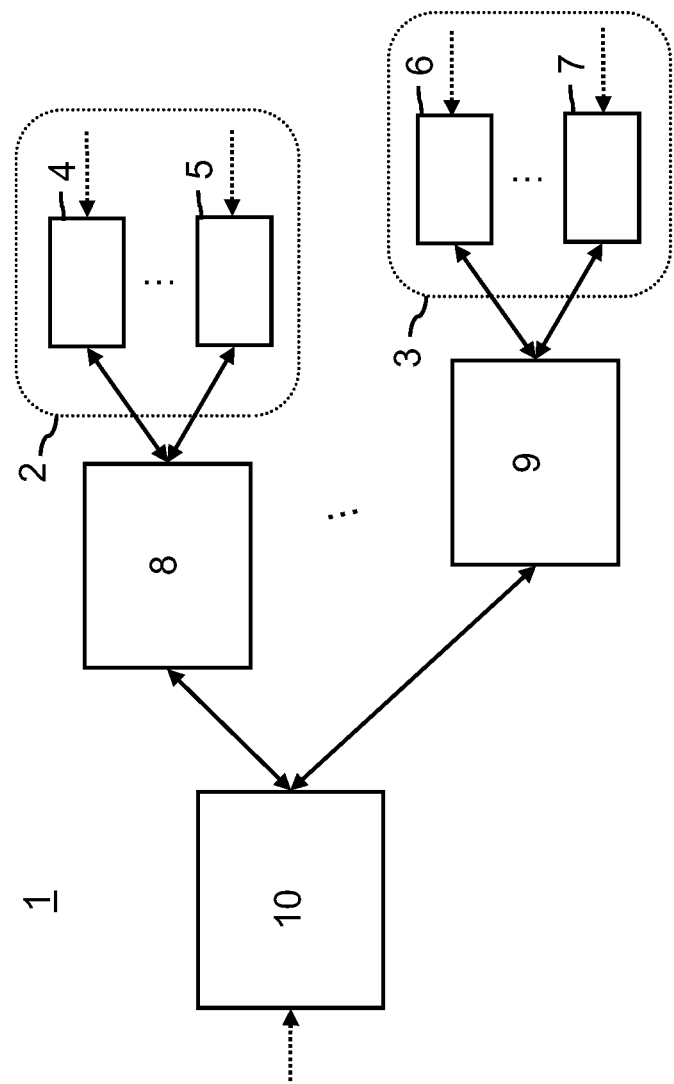
FIG. 1 shows a schematic representation of an embodiment of an energy allocation system that can be implemented to execute an embodiment of a method for allocating energy to devices.

FIG. 1 shows a schematic representation of an embodiment of an energy allocation system that can be implemented to execute an embodiment of a method for allocating energy to devices of the system. The system 1 comprises a plurality of devices 4, 5, 6, 7, as, for example, electric devices, that may store electric energy, consume electric energy or generate electric energy. In the drawing of FIG. 1, each device 4, 5, 6, 7 is assigned to a group 2, 3.

There are shown two exemplary groups 2, 3. Each group's device 2, 3 has an assigned aggregation node 8, 9. The devices 4, 5, 6, 7 of a respective group 2, 3 are communicatively coupled to the aggregation node device 8, 9 assigned to the respective group 2, 3. For example, one may contemplate that a device 4, 5, 6, 7 may couple wirelessly to the respective aggregation node device 8, 9 and exchange data. The system 1 for allocating energy to the devices 4, 5, 6, 7 includes a central processing device 10 that is communicatively coupled to the aggregation node devices 8, 9. One may refer to the central processing device 10 as a root device. For example, the devices 4, 5, 6, 7 include a processing device that allows realizing certain computational functions or algorithms.

The devices 4, 5, 6, 7 can also comprise interfaces to receive input data from, for example, the user of the device. This is indicated by the dashed arrows reaching from the right to the respective devices 4, 5, 6, 7. For example, the user of a device may input a demand forecast for the usage of the device and thereby specifying the prospective use of energy by the device. There can be local cost functions assigned to each device 4, 5, 6, 7. For example, the devices 4, 5, 6, 7 are implemented to convert the usage data input by a user into schematical representations to be transmitted and processed further at the aggregation node devices 8, 9. On the other hand, the central processing module 10 may receive data relating to a power objective, grid constraints or other parameters that my influence the availability of energy in the system or other constraints.

The central processing device 10 which can be implemented as a central server or computer receives aggregated data from the aggregation node devices 8, 9. Based on the received data, the central processing module 10 executes an optimization step which may result in optimization parameters for the devices 4, 5, 6, 7. The central processing module 10 may decide that a further optimization in the system 1 is advantageous. If so, optimization parameters are sent from the central processing module 10 to the aggregation node devices 8, 9 which distribute the optimization parameters to the respective devices 4, 5, 6, 7. Based on the optimization parameters and the actual power profile or local cost function for each device, the devices 4, 5, 6, 7 execute an additional optimization step. Hence, the entire optimization of the system 1 comprising all devices is performed in a distributed fashion. As a result, the system 1 finds the distributed power profile which is optimized with respect to the power objectives.

According to embodiments of the method and system for allocating energy to the devices, a time horizon T including discrete time slots is assumed. A cost function c then relates to a power profile $p \in R^T$. A cost function c can be specified by a utility company setting the cost of energy or power over the time horizon. The global power domain $D \subseteq R^T$ consists of all feasible power profiles. The cost function c can be defined according to the optimization process that is desired. For example, c can represent the forecasted price of the energy.

The devices of the system can be denoted d, where the entirety of the devices form a pool V of devices. Hence, $d \in V$. A local power cost $c_d$ can be assigned to each device: $c_d: V \rightarrow R^T$. The local power cost for device d is, for example, specified by the user of the device. A local power domain $D_d \subseteq R^T$ includes all feasible power profiles for the device d:

$$D_d = \left\{ p \in R^T : P_i^l \leq p_i \leq P_i^u, E_i^l \leq \sum_{j < i} p_j \leq E_i^u \right\}$$

where u/l superscripts stand for upper and lower limits for the consumed power (P) and energy (E) of a device d.

The optimization process now aims at finding a distributable power profile $$p = \sum_{d \in V} p_d$$

under the constraint:

$$\min c \left( \sum_{d \in V} p_d \right) + \sum_{d \in V} c_d(p_d) \text{ with } p_d \in D_d \ \forall \ d \in V \ \sum_{d \in V} p_d \in D.$$

The optimization task as shown above can now be solved hierarchically and distributed by the nodes or devices. The local power cost function $c_d$ is, for example, specified by the user of the device and the local power domain $D_d$.

Figure 2:
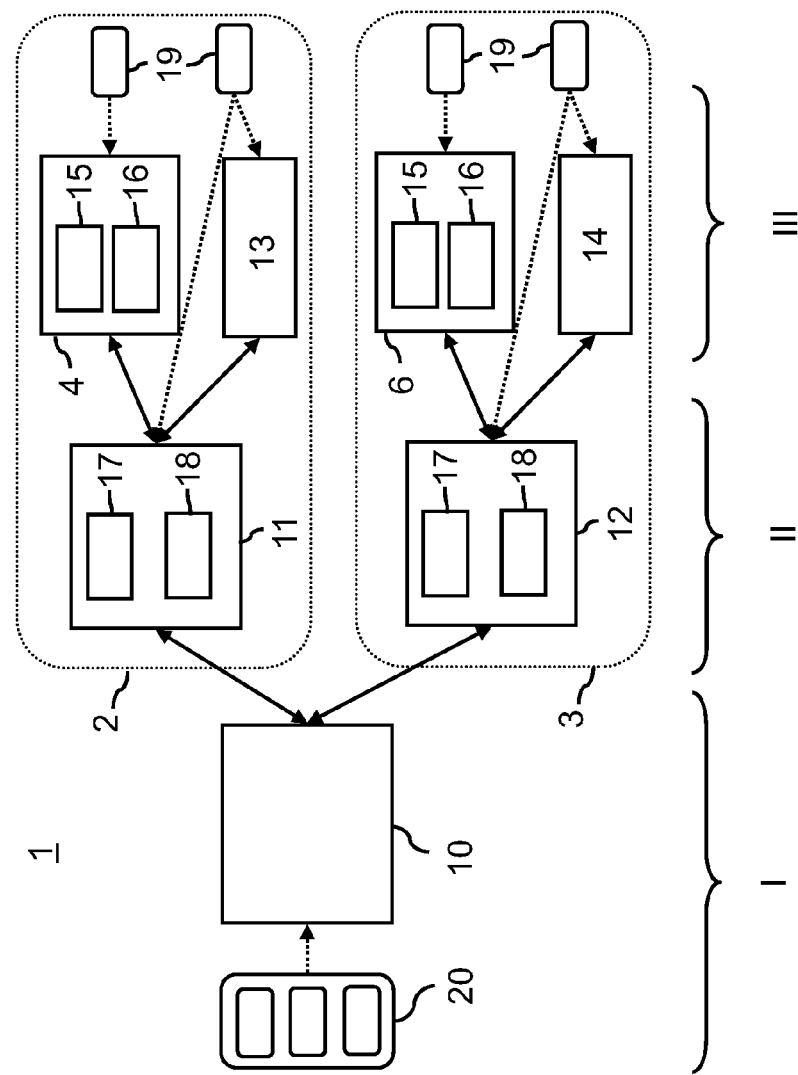
FIG. 2 shows a schematic representation of another embodiment of an energy allocation system that can be implemented to execute an embodiment of a method for allocating energy to devices.

FIG. 2 shows a schematic representation of another embodiment of an energy allocation method and system. The system has a similar architecture as shown in FIG. 1. There are three levels or hierarchies which are indicated by Roman letters I, II, III. At the highest level I, the central processing device or unit 10 is depicted. The central processing unit 10 receives parameters, as for example, a power objective, grid constraints or other constraints on the aggregated power profile. The central or root processing module 10 produces information and data on the entire system. The net's hierarchical level II comprises the aggregation node devices 11, 12. The third hierarchical level III is formed by the actual devices 4, 6, 13, 14.

The system 1 depicted in FIG. 2 comprises two groups 2, 3 of devices 4, 13, 6, 14. The user 19, for example, specifies the local power cost functions and inputs them to the devices 4, 6. The devices 4, 6 have a computational capability, i.e., they are provided with microprocessors or other calculation devices. For example, the devices 4, 6 include a conversion 15 unit for bringing the input data from the user 19 into a proper format for further processing in the aggregation node device 11, 12. Devices 4, 6 also comprise a calculation unit 16 for performing local optimization steps.

The system 1 may also comprise devices that do not have intelligent units, such as the conversion or calculation devices 15, 16. For those devices 13, 14, the associated or assigned aggregation node device 11, 12 performs the optimization calculation or conversion steps during the execution of the energy allocation method. The aggregation node devices 11, 12 comprise an aggregation unit 17 for combining the data received from the devices 4, 6 and if the device 13, 14 does not provide for any calculation or conversion means, data directly from the user input 19. For allocating energy to the devices 4, 6, 13, 14, the optimization process as indicated above is carried out in a distributed manner.

Each device according to a hierarchical level receives optimization parameters from the next higher level device. For example, the devices 4, 13, 6, 14 receive optimization parameters from the aggregation devices 11, 12. The aggregation devices 11, 12 receive the group optimization data from the central processing device 10. Process or data flows involved when the system 1 of FIG. 2 is operated according to an energy allocation method are shown in FIGS. 3 and 4.

Figure 3:
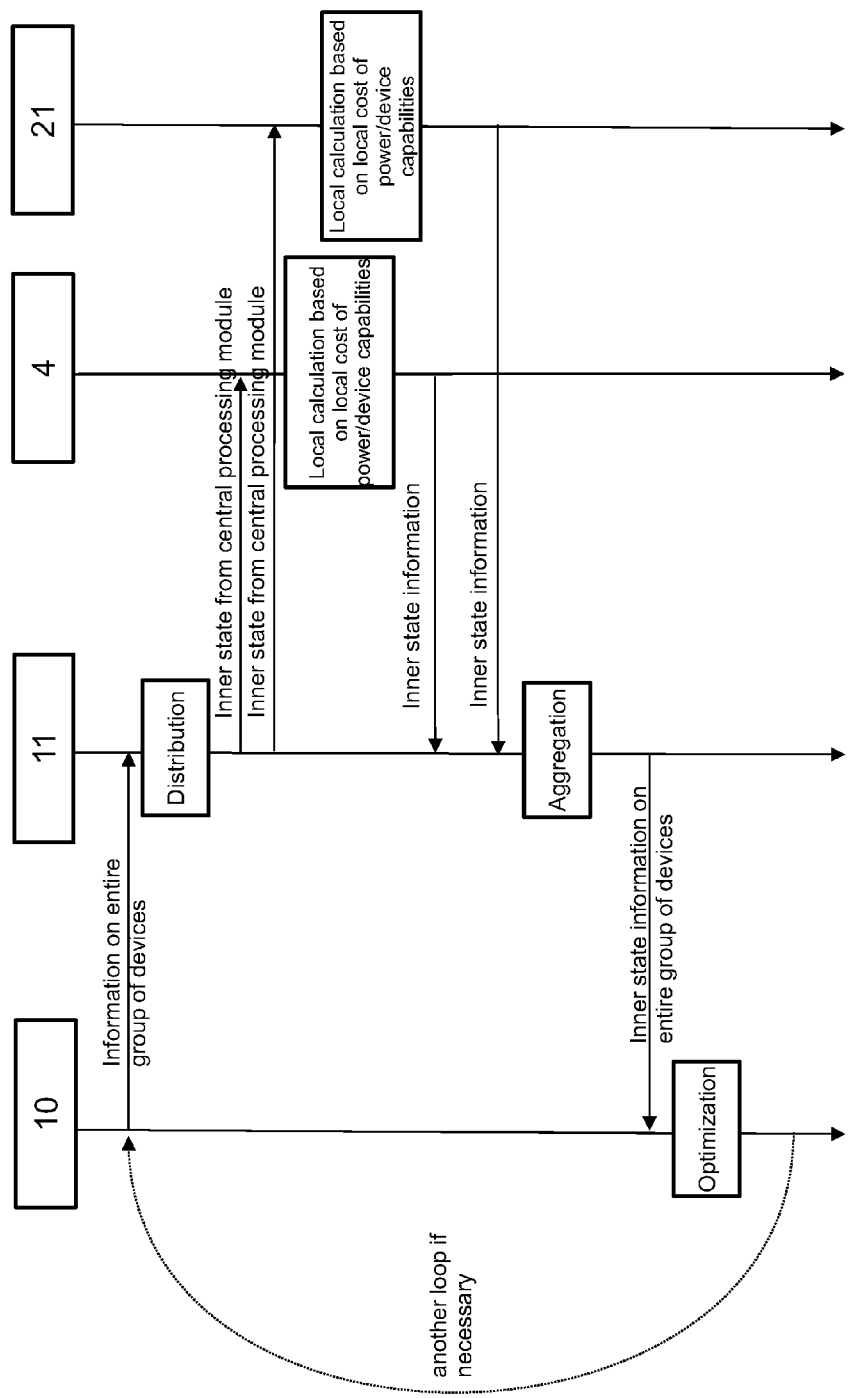
FIG. 3 shows a graphical representation of method steps and data transfers involved in an embodiment of a method for allocating energy.
Figure 4:
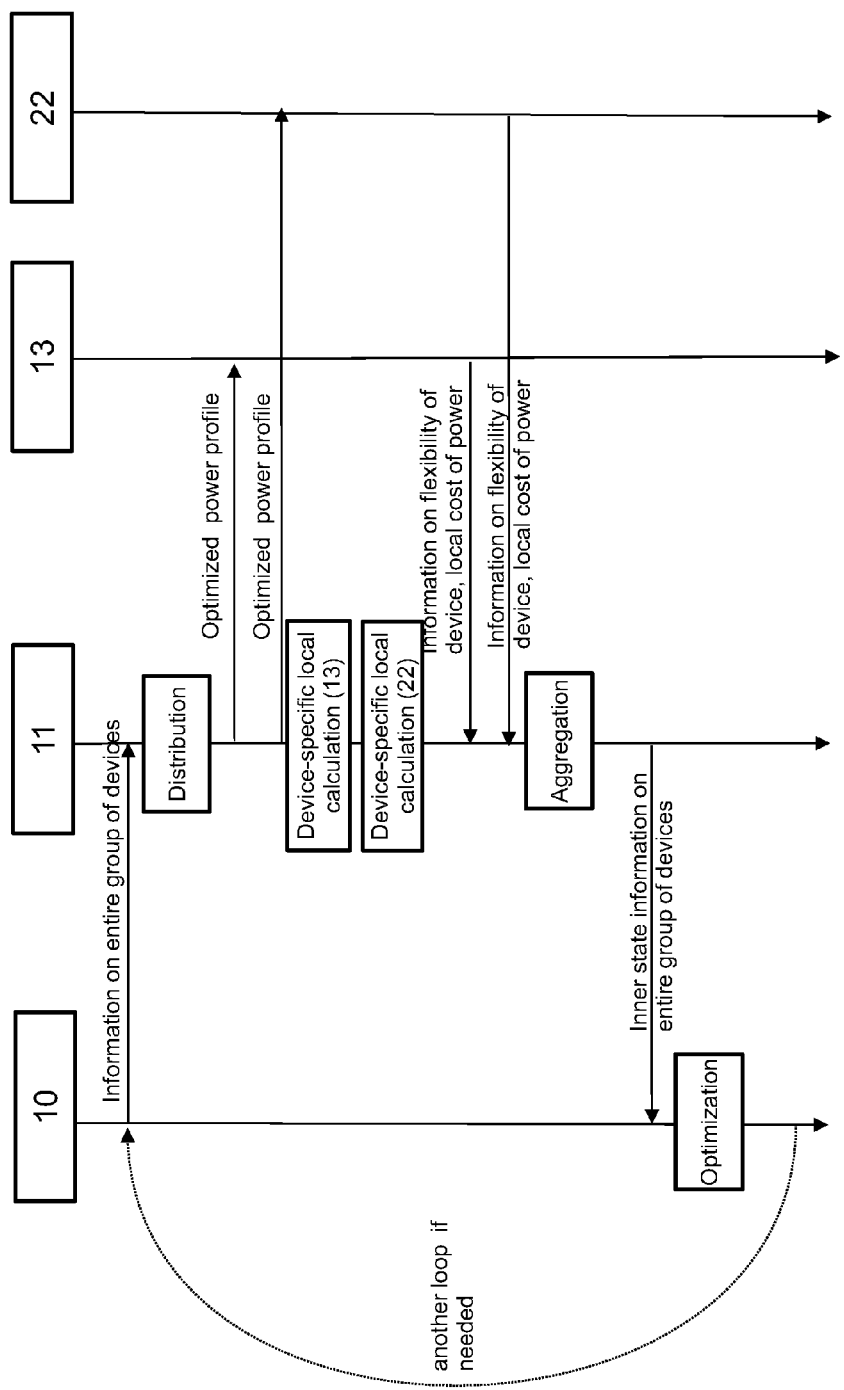
FIG. 4 shows a graphical representation of method steps and data transfers involved in another embodiment of a method for allocating energy.

FIG. 3 relates to the data and process flow when devices 4, 6 are involved that do comprise calculation capability means in terms of the conversion and calculation modules 15, 16. FIG. 4 depicts a data or process flow when devices 13, 14 are involved that do not have calculation devices or internal processes.

Referring first to FIG. 3, the hierarchical levels in terms of the central processing unit 10, one aggregation node device 11 and devices 4, 21 are shown. The central processing device or root node 10 has information on the entire group of devices. Hence, the central processing device 10 executes an optimization step and shares this inner state information with all devices via the aggregation node device 11. The aggregation node device 11 distributes the inner state from the central processing module or device 10 to the devices 4, 21 of the group associated with the aggregation node device 11.

Although not explicitly shown in FIG. 3, the central processing module or device 10 transmits similar information on the group of devices to other aggregation node devices that can be present in the system. Based on the local cost of power or the device capabilities, each device 4, 21 calculates an optimized local cost function using the inner state information from the central processing module, i.e., a local optimization step is performed including the power profile of the respective device 4, 21 and the received power optimization parameters. The respective power profile is then transmitted to the aggregation node device 11 as inner state information. Next, the aggregation node device 11 aggregates the data and transmits inner state information on the group of devices, i.e., devices 4 and 21, to the central processing device 10. Again, a global optimization step is performed by the central processing device 10. If deemed necessary after a first optimization, another loop or optimization run is performed.

Turning now to FIG. 4, the data on the process flow for energy allocation is shown when devices 13, 21 are involved that do not have calculation capabilities on board. Again, the central processing module or device 10 provides information on the group of devices to the aggregation node 11. The aggregation node 11 distributes optimized power profiles to the devices 13, 14. Since the devices 13, 21 do not have a calculation or conversion module, the aggregation node device 11 performs device-specific local calculations for the devices 13 and 22. Optionally, information on the flexibility of the device 13, 22 or the local cost of power can be input as indicated in FIG. 2 from a user 19 directly to the aggregation node device 11, 12. The aggregation node device 11 performs an aggregation and provides the inner state information of the group of devices 13, 22 to the central processing device 10. Again, a global optimization is performed and, if deemed necessary, the process is iteratively repeated.

As a result of the proposed method and systems for energy allocation, the minimum cost power profile is efficiently determined. Many calculation steps are performed in parallel through the devices or associated calculation units in the aggregation node devices. In principle, a real-time implementation of the system is possible. By performing certain optimization steps locally at the devices or the respective aggregation node no consumption-related information needs to be revealed to the central processing device. Therefore privacy in relation to the device user's or consumer's energy consumption habits is ensured. In contrast to centralized systems, the hierarchical architecture and the provision of groups and devices with associated or assigned aggregation node devices reduce the overall number of messages transmitted. By iteratively performing the optimization steps, a very efficient optimization can be performed.

The described examples show three hierarchical levels between the devices and the central root. One may contemplate more levels, such that a plurality of aggregation nodes is present in a path from the devices to the central root.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program or program module, the latter executed by suitable digital processing devices. In further exemplary embodiments, at least one step or all steps of the above methods illustrated with respect to FIGS. 1-4 may be implemented in software, as an executable program, the latter executed by suitable digital processing devices. More generally, embodiments of the present invention can be implemented wherein general-purpose digital computers, such as personal computers, workstations, etc., are used. For example, the before-mentioned aggregation node device and/or the central processing device may be implemented as computerized systems.

Figure 5:
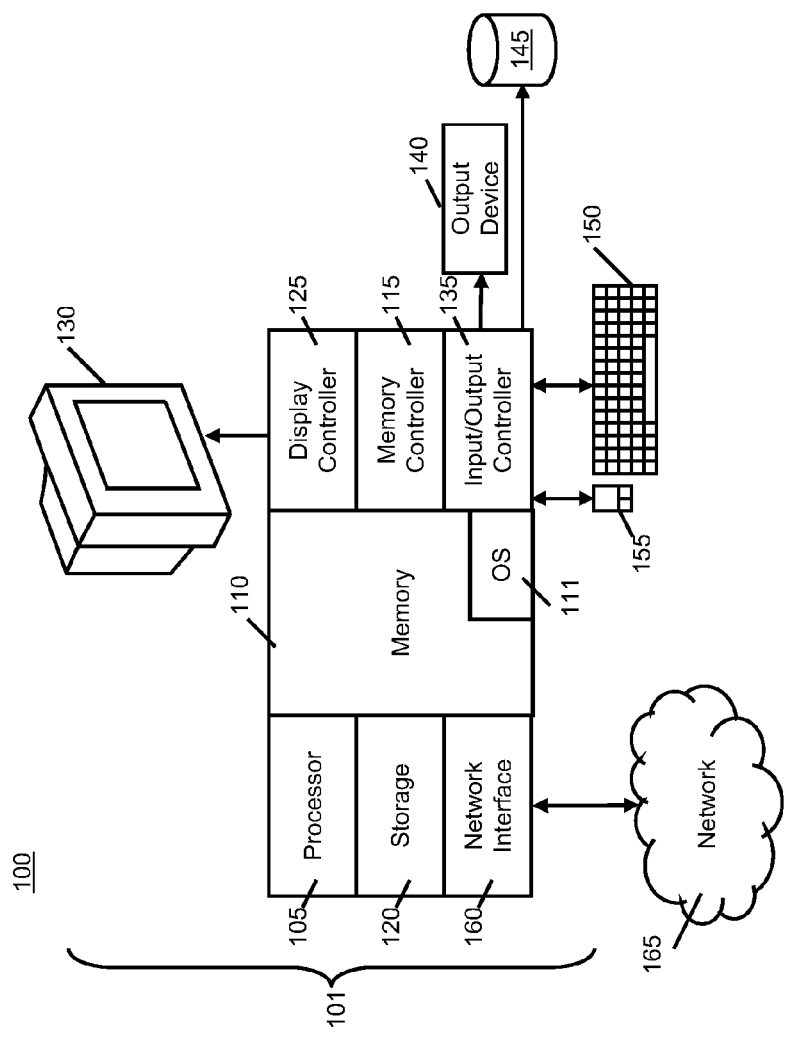
FIG. 5 shows a schematic diagram for a computerized system suitable for implementing embodiments of an energy allocation method.

For instance, the system 100 depicted in FIG. 5 schematically represents a computerized unit 101, e.g., a general-purpose computer. In exemplary embodiments, in terms of hardware architecture, as shown in FIG. 5, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 5, the software in the memory 110 includes methods described herein in accordance with exemplary embodiments and a suitable operating system (OS) 111. The OS 111 essentially controls the execution of other computer programs, such as the methods as described herein (e.g., FIGS. 3 and 4), and provides scheduling, input-output control, file and data management, memory management, and communication control and related services. For example, the interface 1 may be embodied in the OS 111.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 135 for further processing. Sensor nodes are ideally small, consume low energy, are autonomous and operate unattended.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein (e.g., with reference to FIG. 2, 3, or 4) are implemented in software, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 101, partly thereon, partly on a unit 101 and another unit 101, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

List of Reference Characters

1 energy allocation system
2, 3 device group
4-7 electric device
8, 9 aggregation node device
10 central processing device
11, 12 aggregation node device
13, 14 device without processing capability
15 conversion unit
16 calculation unit
17 aggregation unit
18 calculation unit
19, 20 input
21 device with processing capability
22 device without processing capability
100 system
101 computerized unit
105 processor
110 memory
111 operating system
115 memory controller
120 storage
125 display controller
130 display
135 controller
140-155 I/O device
160 transceiver
165 communications network

The invention claimed is:

1. A system for allocating energy, comprising:
a plurality of devices, wherein each device is configured to consume, store and/or supply energy, and each device is assigned to a group of devices;
one aggregation node device assigned to each group of devices, the aggregation node device being configured to generate aggregated data as a function of at least one of received power cost functions or power usage profiles, wherein the aggregated data includes inner state information for each of a selection of devices; and
a transmitter for transmitting the aggregated data to a central processing device, the aggregated data including inner state information for each of the selection of devices, the central processing device being configured to optimize a global cost function for allocating power to the devices as a function of the aggregated data, the optimizing comprising generating, at the central processing device, device optimization parameters for each of the devices, and transmitting the device optimization parameters to each of the devices via the aggregation node device,
wherein the aggregation node device is configured to aggregate data received from the devices and transmit the aggregated data to the central processing device.

2. The system of claim 1, wherein the devices are at least of the group of: electric cars, heating devices, pumping devices, air-conditioning devices, batteries, fly wheels, and household appliances.

3. The computer program product of claim 1, wherein, if further optimization is desired, the generating device optimization parameters is iteratively performed until an optimal distributed power profile for one or more predetermined power objectives is determined.

4. The computer program product of claim 3, further comprising: transmitting the optimal distributed power profile to the devices via the aggregation node devices.

5. The computer program product of claim 3, further comprising: optimizing the local power cost functions as a function of the optimization parameters at the devices.

6. The computer program product of claim 5, further comprising: for at least one device of a group, optimizing the local power cost function as a function of the optimization parameters for the at least one device at the assigned aggregation node device.

7. The computer program product of claim 5, wherein the step of optimizing the local power cost function at a device is independent from the local power cost function of the device and/or power usage profile of the device with respect to a prior time slot.

8. A computer program product for allocating energy to a plurality of devices, wherein each device is configured to consume, store and/or supply energy, the computer program product comprising a computer readable storage medium having computer readable program code embodied therewith, the computer readable program code comprising computer readable program code configured to allocate energy to the devices implementing the steps of:
assigning each device to a group of devices;
assigning an aggregation node device to each group of devices;
for a selection of devices, transmitting local power cost functions of the devices and/or power usage profiles of the devices with respect to a predetermined time slot to the assigned aggregation node device;
at the aggregation node device, generating aggregated data as a function of the received local power cost functions and/or power usage profiles;
transmitting the aggregated data to a central processing device, the aggregated data including inner state information for each of the selection of devices; and
at the central processing device, optimizing a global cost function for allocating power to the devices as a function of the aggregated data, the optimizing comprising generating device optimization parameters for each of the devices, and transmitting the device optimization parameters to each of the devices via the aggregation node device.

9. The computer program product of claim 8, further comprising: for at least one device of a group, providing the assigned aggregation node device with the local power cost function of the at least one device and/or the power usage profile of the at least one device with respect to the predetermined time slot.

10. The computer program product of claim 8, further comprising: changing an assignment of a device from a first group to a second group.

11. The computer program product of claim 8, wherein optimizing comprises minimizing the global cost function for allocating power to the devices as a function of the aggregated data.

12. The computer program product of claim 8, wherein aggregating comprises combining the local power cost functions of the devices and/or power usage profiles of the devices for obtaining a group cost function or a group power usage profile.

13. The computer program product of claim 8, wherein the computer program product is configured to iteratively perform the steps of:
transmitting local power cost functions of the devices and/or power usage profiles of the devices with respect to a predetermined time slot to the assigned aggregation node device;
generating aggregated data as a function of the received local power cost functions and/or power usage profiles;
transmitting the aggregated data to the central processing device;
optimizing the global cost function for allocating power to the devices as a function of the aggregated data;
generating optimization data for each device at the central processing device;
transmitting the optimization data to the devices via the aggregation node devices; and
optimizing the local power cost functions as a function of the optimization data.

14. A system for allocating energy, comprising:
a plurality of devices, wherein each device is configured to consume, store and/or supply energy, and each device is assigned to a group of devices;
one aggregation node device assigned to each group of devices, the aggregation node device being configured to generate aggregated data as a function of at least one of received power cost functions or power usage profiles, wherein the aggregated data includes inner state information for each of a selection of devices; and
a transmitter for transmitting the aggregated data to a central processing device, the aggregated data including inner state information for each of the selection of devices, the central processing device being configured to optimize a global cost function for allocating power to the devices as a function of the aggregated data, the optimizing comprising generating, at the central processing device, device optimization parameters for each of the plurality of devices, and transmitting the device optimization parameters to each of the plurality of devices via the aggregation node device,
wherein the aggregation node device is configured to aggregate data received from the devices and transmit the aggregated data to the central processing device.

* * * * *